No. 778,220. PATENTED DEC. 27, 1904.
S. L. BUNDAY.
SCALE BEAM.
APPLICATION FILED JUNE 11, 1904.
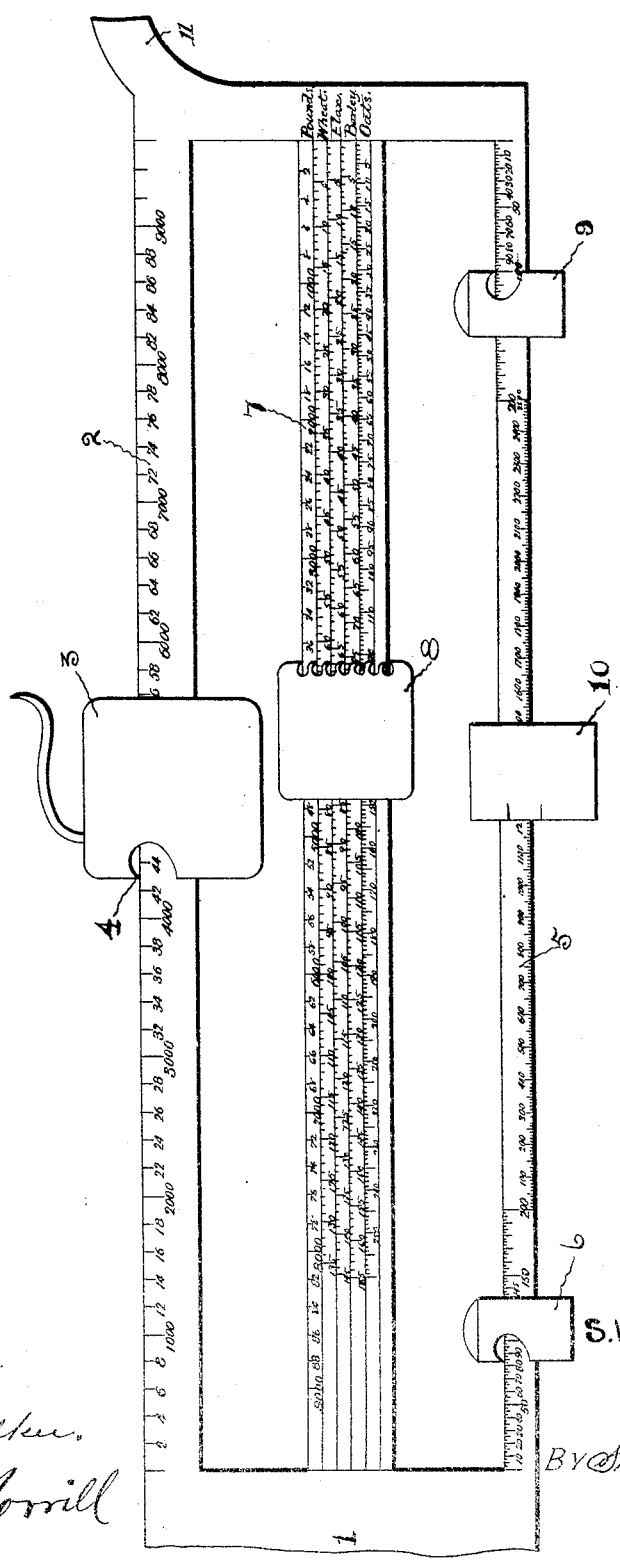
WITNESSES:
S. L. Bunday
INVENTOR
By Shepherd Parker
Attorneys.

No. 778,220.  Patented December 27, 1904.

UNITED STATES PATENT OFFICE.

SIDNEY L. BUNDAY, OF ARLINGTON, SOUTH DAKOTA.

SCALE-BEAM.

SPECIFICATION forming part of Letters Patent No. 778,220, dated December 27, 1904.

Application filed June 11, 1904. Serial No. 212,111.

*To all whom it may concern:*

Be it known that I, SIDNEY L. BUNDAY, a citizen of the United States, residing at Arlington, in the county of Kingsbury and State of South Dakota, have invented a certain new and useful Improvement in Scale-Beams, of which the following is a specification.

My invention relates to scale-beams, and has for its principal object to provide a scale-beam adapted to indicate both gross and net weight on the same beam at the same time.

Another object of my invention is to provide a scale-beam adapted for use in connection with scales adapted to weigh entire loads of material at a point where the contents are to be unloaded and the empty vehicle again weighed to determine the weight of the contents unloaded.

A further object of my invention is to provide a scale-beam especially adapted for use at grain-elevators, where wagon-loads of grain are received, the grain unloaded, and the wagon again weighed to determine the number of bushels of grain so unloaded.

I accomplish these objects by the use of ordinary scale-beam bars designed to weigh the entire load and the use of poises on such bars adapted to be moved away from the fulcrum in the usual manner to indicate the gross weight. The contents of the wagon are then unloaded, and poises normally disposed at the extreme end of the bars away from the fulcrum are moved toward the fulcrum, thus compensating for the material removed and showing by properly-marked spacing upon the bars the amount so removed in pounds and also in bushels and fractions of bushels of the various grains for use in connection with which the scale-beam is designed to be used.

With these and other objects in view the present invention consists in the combination and arrangement of parts, as will be hereinafter more fully described, shown in the accompanying drawing, and particularly pointed out in the appended claims, it being understood that changes in the form, proportion, size, and minor details may be made within the scope of the claims without departing from the spirit or sacrificing any of the advantages of this invention.

The figure shown is a view in side elevation of my improved scale-beam with the poises thereon.

In the preferred form of my invention I construct my beam with a plurality of horizontally-disposed parallel bars in accordance with the well-known form of gridiron scale-beams, said bars all extending entirely upon one side of the usual fulcrum located at one end of the beam, (designated as 1.) The upper bar 2 is properly spaced and marked to indicate gross weight up to ten thousand pounds in graduations of two hundred pounds each from left to right or away from the fulcrum. Upon such bar is mounted a poise 3, adapted to slide upon such bar and indicate the weight by the point 4. Upon the lower bar 5 is slidably mounted an auxiliary poise 6, adapted to be operated in conjunction with and supplemental to poise 3. The portion of the bar 3 whereon poise 6 is mounted is designated to indicate weights up to two hundred pounds in graduations of two and one-half pounds, said graduations running from left to right or away from the fulcrum. Upon the middle bar 7 is slidably mounted a poise 8. The bar 7 is properly marked to indicate weights up to ten thousand pounds in graduations of two hundred pounds each and also in bushels of various grains, as wheat, barley, oats, and other grains. Upon bar 5 is also mounted an auxiliary poise 9. The portion of bar 5 occupied by the auxiliary poise 9 is properly marked to indicate weights up to two hundred pounds in graduations of two and one-half pounds. The auxiliary poise 9 is used in conjunction with and supplemental to the poise 8. Upon bar 5 is also mounted a poise 10. The portion of bar 5 occupied by poise 10 is marked to indicate weights up to two thousand five hundred pounds in graduations of ten pounds. Upon the end 11 of the beam is formed the usual gooseneck used for controlling the action of the beam.

The operation of my improved scale-beam is as follows: The scale balances with the poises 3 and 6 at the extreme left nearest the fulcrum, with the poises 8 and 9 at the extreme right or farthest from the fulcrum and the poise 10 at the extreme left of its range or nearest the fulcrum. A loaded wagon is now driven upon the scales and the poise 3 moved from the fulcrum to the point indicating the entire gross amount in pounds which can be weighed in graduations of two hundred pounds. The auxiliary poise 6 is then moved from the fulcrum to complete the counterbalancing of the loaded wagon. The number of pounds indicated by the poise 6 added to the number of pounds indicated by the poise 3 will be the entire gross weight of the load. The contents of the wagon is then unloaded. To compensate for the material removed, the poise 8 is moved toward the fulcrum. If it is desired to indicate the amount of material removed in pounds, the poise 8 is placed at the two-hundred-pound mark nearest indicating such weight and the weighing completed by moving the auxiliary poise 9 toward the fulcrum. The number of pounds of material removed can then be read directly from the scale-beam by reading first the hundreds indicated by poise 8 and the pounds indicated by poise 9. If it is desired to indicate in bushels the amount of material removed, the poise 8 is moved to the bushel-mark most nearly balancing the scale, and the auxiliary poise 9 is then moved toward the fulcrum to balance. The amount of material removed in bushels and fractions thereof may then be read directly from the beam by reading the number of bushels indicated by poise 8 and the number of pounds indicated by poise 9.

To adapt the scale for uses wherein an empty vehicle is first weighed, then loaded, and weighed again to ascertain the amount of material so loaded upon the vehicle, the poise 10 is provided. The operation in such connection is as follows: The scale is first balanced by disposing the several poises as before described. The empty vehicle is then driven upon the scale and the poise 10 moved from the fulcrum to counterbalance. This will indicate in pounds the weight of the empty vehicle. The load is now placed upon the vehicle and the poise 3 moved from the fulcrum to the two-hundred-pound mark most nearly counterbalancing the load. The counterbalancing is then completed by the movement of the auxiliary poise 6 away from the fulcrum. The weight of the material contained in the vehicle can then be read directly from the beam by adding the weight indicated by poise 6 to the amount indicated by poise 3.

It is also obvious that different graduations from those indicated might be used and that other quantities containing an arbitrary number of pounds might be indicated instead of bushels. It is further obvious that other grains with graduation to indicate bushels thereof might be added to those shown and described or that any or all of those shown and described might be omitted and other and different ones substituted therefor and that other minor changes in the form, graduations, and markings might be made without departing from the spirit of my invention.

Having thus described my invention, what I claim as novel, and desire to secure by Letters Patent, is—

1. In a scale-beam, a bar extending entirely upon one side of the fulcrum and provided with a plurality of scales each occupying an independent longitudinal portion of the bar, one of said scales being graduated away from the fulcrum and one graduated toward the fulcrum, in combination with an equal number of poises each disposed and adapted to indicate weights upon one of said scale portions.

2. In a scale-beam, the combination of a plurality of bars lying in the same plane and all extending entirely upon the same side of the fulcrum, one of said bars being provided with a poise and with a plurality of scales each occupying an independent transverse space upon the face thereof, one of said scales being graduated to indicate in conjunction with the poise the weight in pounds and the other scales being graduated to indicate in conjunction with the poise the weight in bushels of various articles and another bar being provided with a plurality of scales each occupying an independent longitudinal portion of the bar and having an equal number of poises each disposed and adapted to indicate weights upon one of said scale portions.

3. In a scale-beam the combination of a plurality of bars lying in the same plane and all extending entirely upon the same side of the fulcrum, one of said bars being provided with a poise and with a scale graduated away from the fulcrum and marked to indicate in conjunction with the poise weights in pounds, a bar provided with a poise and with a plurality of scales graduated toward the fulcrum and occupying independent transverse spaces upon the face of the bar, one of said scales being marked to indicate in conjunction with the poise weights in pounds of material removed, the other scales being marked to indicate in conjunction with the poise weights in bushels of various articles removed and a bar provided with a plurality of scales each occupying an independent longitudinal portion of the bar and having an equal number of poises each disposed and adapted to indicate weights upon one of said scale portions.

SIDNEY L. BUNDAY.

In presence of—
A. F. BLODGET,
C. M. STORY.